United States Patent
Persson et al.

(10) Patent No.: US 8,311,542 B2
(45) Date of Patent: Nov. 13, 2012

(54) OFFERED BIT RATE AT HANDOVER

(75) Inventors: Fredrik Persson, Märsta (SE); Tomas Hedberg, Stockholm (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 33 days.

(21) Appl. No.: 12/812,136

(22) PCT Filed: Oct. 7, 2008

(86) PCT No.: PCT/SE2008/051145
§ 371 (c)(1),
(2), (4) Date: Jul. 8, 2010

(87) PCT Pub. No.: WO2009/088339
PCT Pub. Date: Jul. 16, 2009

(65) Prior Publication Data
US 2010/0285803 A1     Nov. 11, 2010

Related U.S. Application Data

(60) Provisional application No. 61/019,711, filed on Jan. 8, 2008.

(51) Int. Cl.
*H04W 36/00* (2009.01)
*H04W 72/00* (2009.01)
(52) U.S. Cl. ...... 455/436; 455/437; 455/438; 455/452.2
(58) Field of Classification Search .................. 455/436, 455/437, 438, 452.2
See application file for complete search history.

(56) References Cited

U.S. PATENT DOCUMENTS

| | | | | |
|---|---|---|---|---|
| 6,243,582 | B1 * | 6/2001 | Lahtinen | 455/436 |
| 6,269,078 | B1 * | 7/2001 | Lakshman et al. | 370/230 |
| 8,041,375 | B2 * | 10/2011 | Laroia et al. | 455/517 |
| 2002/0055359 | A1 * | 5/2002 | Andersson et al. | 455/426 |
| 2006/0140117 | A1 * | 6/2006 | Aerrabotu et al. | 370/232 |

(Continued)

FOREIGN PATENT DOCUMENTS

WO    WO 97/23110 A    6/1997

(Continued)

OTHER PUBLICATIONS

Ericsson et al: "Rate adaptation: Text Proposal" 3GPP Draft; ,S2-075185-Rate-Adaptation-Text-Proposal-RE VI, 3rd Generation Partnership Project (3GPP), Mobile Competence Centre; 650, Route des Lucioles ; F-06921 Sophia-Antipolis Cedex ; France, vol. SA WG2, No. Ljubljana; 20071112, Nov. 2, 2007, XP050261902 chapter 4.7.5.

(Continued)

*Primary Examiner* — Marisol Figueroa

(57) ABSTRACT

The invention relates to a method in a second communication node within a communications network supporting a handover process of a first communication device from a first cell in the communications network to a second cell of the second communication node in the communications network. The second communication node determines (12) that a handover is to be performed of the first communication device from the first cell to the second cell. The second communication node then estimates (T4) an offered bit rate for the communication device within the second cell of the second communication node based on at least one parameter of the second cell. The offered bit rate is then transmitted (T6) in a message to the first communication device from the second communication node.

12 Claims, 12 Drawing Sheets

U.S. PATENT DOCUMENTS

2007/0248028 A1    10/2007    Choe

FOREIGN PATENT DOCUMENTS

WO    WO 2008/055169 A    5/2008

OTHER PUBLICATIONS

Ericsson: "Rate adaptation with MBR>G3R bearers" 3GPP Draft; S2-075184-Rate-Adaptation-REV1. 3$^{rd}$ Generation Partnership Project (3GPP), Mobile Competence Centre ; 650, Route des Lucioles ; F-06921 Sophia-Antipolis Cedex ; France, vol. SA WG2, No. Ljubljana; 20071112, Nov. 2, 2007, XP050261901 1 Introduction and background 2.2 Introducing the Offered Bit Rate (OBR) 2.3 The Use of ECN to trigger Rate Reduction at the Media Layer.

* cited by examiner

OFFERED BIT RATE AT HANDOVER

This application claims the benefit of U.S. Provisional Application No. 61/019,711, filed Jan. 8, 2008, the disclosure of which is fully incorporated herein by reference.

TECHNICAL FIELD

This invention relates to methods and devices in a communications network, in particular, methods and devices supporting a handover of a first communication device from a first cell to a second cell in the communications network.

BACKGROUND

In 3GPP cellular networks it is possible to guarantee resources through a guaranteed bit rate, GBR, but also to provide additional resources when available but limited by a maximum bit rate, MBR, which can be utilized by adaptive applications. The MBR is set to be smaller or the same as the GBR, that is, MBR≦SBR. However, the application needs support to set the initial rate correctly and also to switch down the rate in time in case of degraded service conditions from the network. In some scenarios, it may also be preferred to upgrade the rate in case the service conditions are again improving.

When doing a handover to a heavily/less loaded cell or by an Inter Radio Access Technology, IRAT, handover to a Radio Access Technology, RAT, with a lower/higher capability the service offered by the Radio Access Network, RAN, can be changed abruptly. If the application does not get a notification about this in advance it runs the risk of heavily degraded user service performance. Even though the application may be able to recover over time, such abruptions should be avoided. One such example may be where an mobile station/user equipment, MS/UE, with an active Voice over IP, VoIP/IP Multimedia Subsystem, IMS, call is moving from LTE coverage to 2G RAN, i.e. GSM EDGE Radio Access Network, GERAN, coverage.

If no explicit congestion notification is given to the application, it will be notified implicitly by experienced packet drops. However, this is not acceptable for several applications, e.g. a video service would be stalled or the like.

One example on how to notify an application explicitly about increased risks for congestion in the network, before congestion happens, is to use the Explicit Congestion Notification (ECN) on the IP layer. When getting the ECN indication the application in the receiver can use application layer signaling to ask the sender to lower the send rate and by that avoid packet losses. However, a handover will in some cases give additional delays and sometimes also buffering. This impairs the possibility to adjust the rate based on the ECN indication.

SUMMARY

There is a desire in embodiments herein to enhance the performance of a handover in a communications network.

Embodiments relate to a method in a second communication node within a communications network. The method is supporting a handover process of a first communication device from a first cell in the communications network to a second cell of the second communication node in the communications network.

The second communication node determines that a handover is to be performed of the first communication device from the first cell to the second cell. The second communication node then estimates an offered bit rate for the communication device within the second cell of the second communication node based on at least one parameter of the second cell. The offered bit rate is then transmitted in a message to the first communication device from the second communication node.

Some embodiments relate to a second communication node performing the method. The second communication node comprises a control unit arranged to determine that a handover is to be performed of a first communication device from a first cell in a communications network to a second cell of the second communication node in the communications network.

Furthermore, the control unit is arranged to estimate an offered bit rate for the first communication device within the second cell of the second communication node based on at least one parameter of the second cell.

The second communication node further comprises a communication interface adapted to transmit a message comprising the offered bit rate to the first communication device. Some embodiments relate to a method in a first communication device within a communications network connected to a first cell in the communications network. The first communication device receives a message originating from a second cell of a second communication node comprising an offered bit rate within the second cell. The first communication device further determines a current bit rate to be used in the second cell based on the offered bit rate and an application to be used in the second cell and transmits a message comprising the current bit rate to a second communication device.

The first communication device adapts to an operational mode of the first communication device to communicate in the current bit rate.

Some embodiments relate to a first communication device performing the method. The first communication device comprises a control unit arranged, via a receiving arrangement, to receive a message originating from a second communication node. The method is performed during a handover process of the first communication device from a first cell in the communications network to a second cell of the second communication node in the communications network.

The message comprises an offered bit rate within the second cell and the control unit is further arranged to determine a current bit rate to be used in the second cell based on the offered bit rate and an application to be used in the second cell. The first communication device comprises a transmitting arrangement adapted to transmit a message comprising the current bit rate to a second communication device.

The control unit is further arranged to adapt an operational mode of the first communication device to communicate in the current bit rate.

In some embodiments a method in a first communication node in a communications network during a handover process of a first communication device from a first cell of the first communication node to a second cell of a second communication node is disclosed.

The first communication node receives a measurement report of the second cell from a first communication device. The first communication node further determines whether to perform a handover from the first cell to the second cell based on at least the measurement report, and to transmit the measurement report to the second communications node of the second cell In order to perform the method a first communication node is provided.

The first communication node, arranged to serve a first node in a communications network, comprises a receiving arrangement arranged to receive a measurement report of a second cell of a second communication node from the first communication device. The first communication node comprises a control unit arranged to analyse the measurement report to determine whether to perform a handover of the first communication device from the first cell to the second cell and a network interface arranged to transmit the measurement report to the second communication node of the second cell.

In some embodiments a method in a system in a communications network supporting a handover process in the communications network of a first communication device from a first cell of a first communication node to a second cell of a second communications node is disclosed.

The first communication device receives a radio signal from the second cell, performs a measurement on the received signal, creates a measurement report on the received signal and transmits the measurement report to the first communication node.

The first communication node receives the measurement report of the second cell, determines to perform a handover from the first cell to the second cell based on at least the measurement report and transmits the measurement report and a handover request to the second communications node of the second cell.

The second communication node receives the handover request at the second communication node and determines that a handover is to be performed of the first communication device from the first cell to the second cell. The second communication node further estimates an offered bit rate for the communication device within the second cell based on at least one parameter of the second cell and transmits the offered bit rate in a message to the first communication device via the first communication node.

The first communication device receives a message originating from the second communication node comprising the offered bit rate within the second cell, determines a current bit rate to be used in the second cell based on the offered bit rate and an application to be used in the second cell, and transmits a message comprising the current bit rate to a second communication device.

The first and second communication devices adapt to an operational mode to communicate in the current bit rate.

By indicating the instantaneous rate the target RAN can offer, e.g., in a parameter here referred to Offered Bit Rate, OBR, it is possible to give an adaptive application the information needed to set the initial rate after handover.

BRIEF DESCRIPTION OF THE DRAWINGS

Embodiments will now be described in more detail in relation to the enclosed drawings, in which.

DETAILED DESCRIPTION OF EMBODIMENTS

Figure 1:
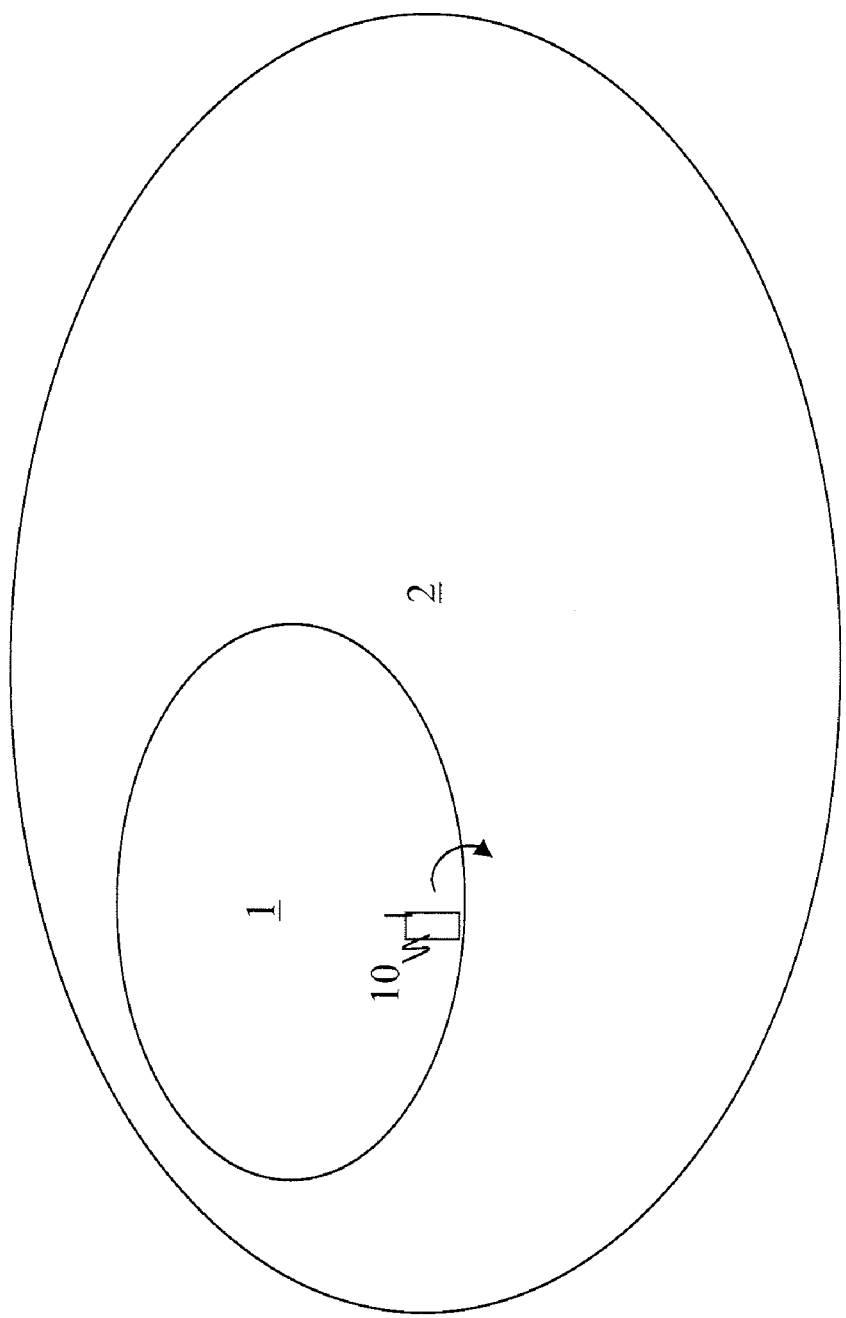
FIG. 1 shows a schematic overview of a communication device from a first cell to a second cell.

FIG. 1 shows an example of a handover process of a first communication device 10 from a first cell 1 to a second cell 2 during an active application session. One such example may be where an mobile station/user equipment, MS/UE, with an active Voice over IP, VoIP/IP Multimedia Subsystem, IMS, call is moving from LTE coverage to 2G RAN, i.e. GERAN coverage. It should also be understood that the cells may be served by the same base station or by different base stations. The cells may be of different radio access technologies, different capacities, micro/macro cells, and/or the like. It should be understood that, in the example wherein the nodes are different nodes, the first node is considered to be the source node and the second node is considered to be the target node.

By indicating the instantaneous rate the RAN can offer, e.g. in a parameter here referred to Offered Bit Rate, OBR, it is possible to give an adaptive application the information needed to set the initial rate after handover. Typically, the application starts at the highest rate possible.

The MS 10 is informed of the offered bit rate, OBR, of the second cell 2 from the second cell 2. Using the ECN mechanism would not provide an exact indication about the new OBR, for example, during/after handover or the like. Instead, ECN only provides an indication about congestion being notified in a kind of on-off way. This means that the receiver and the sender applications need to decide on the application layer the new value to be used as the bit rate without any exact knowledge of the current available bit rate. This will most likely result in lowering the current bit rate to a lower value than really is currently available i.e. decreasing the bit rate used unnecessarily much. Another problem with an ECN-based mechanism is that it doesn't provide any possibility for an upgrade mechanism i.e. there is no way to indicate that the current rate could be increased again.

Instead, in the illustrated example, the second node/RAN controlling the second cell 2 estimates the new OBR that will be available after handover to the second cell in the second RAN. This new OBR is then signaled to the MS 10 which may be used as a trigger to notify a sender that the current bit rate, CuBR, is about to change and that the sender would need to adjust by either decreasing or increasing the bit rate being used.

In addition, the first node serving the first cell 1 may inform the second node about a current measurement result that the MS 10 has performed on the second cell 2. This information may also be used by the second node to estimate the new OBR.

When doing a handover to a heavily loaded cell or by an IRAT handover to a RAT with a lower capability, the application layer is notified about the OBR of the second cell. The application may based on the notification then lower its current bit rate to the appropriate level already before the handover is completely executed or the bit rate may be lowered right after the handover execution.

Similarly, when doing a handover to a less loaded cell or by an IRAT handover to a RAT with a higher capability, the application layer is notified about the OBR of the second cell.

The application may based on the notification then increase its current bit rate to the appropriate level already before the handover is completely executed or the bit rate may be increased right after the handover execution.

When setting up radio bearers, RABs, in the second cell 2, the second node transmits its capabilities to the serving first node of the first cell 1, including the OBR. The decision to select the OBR in the second cell 2 depends on different information. This could for example be based on load in the second cell, communication device capabilities and/or RABs/PFCs Packet Flow Contexts to be established in the second cell.

In some embodiments, measurement/s on the second cell 2 that the MS 10 reported in the first cell 1 is forwarded also to the second cell 2 as part of the Packet Switched Handover, PS HO, preparation signaling. This information may then be used by the second node to further estimate the bit rate that will be available, OBR, for the MS 10 in the second cell 2. The measurement information maybe reported from the first RAN to the second RAN by using, for example, some transparent RAN information element or the like.

Once the target OBR (i.e. the OBR in the target cell) is decided by the second node it can be inserted as an information element in one of the messages reaching the MS 10. For example, it could be part of an E-UTRAN Handover Command message that is prepared by the second RAN and forwarded transparently to the MS. In some embodiments, for example, when a handover is performed to a node in LTE, such as an Intra-LTE handover, then the creation of a handover command message is performed in the target second node and some information is added in the source first node. Hence, the communication through the first node would not be transparent.

The OBR is conveyed from the RAN to the application layer during handover to make a new estimate of the target rate prior to complete handover execution. This will make it possible for the application to adapt, both increase and decrease, its send rate to the conditions in or capabilities of the second cell.

Figure 2:
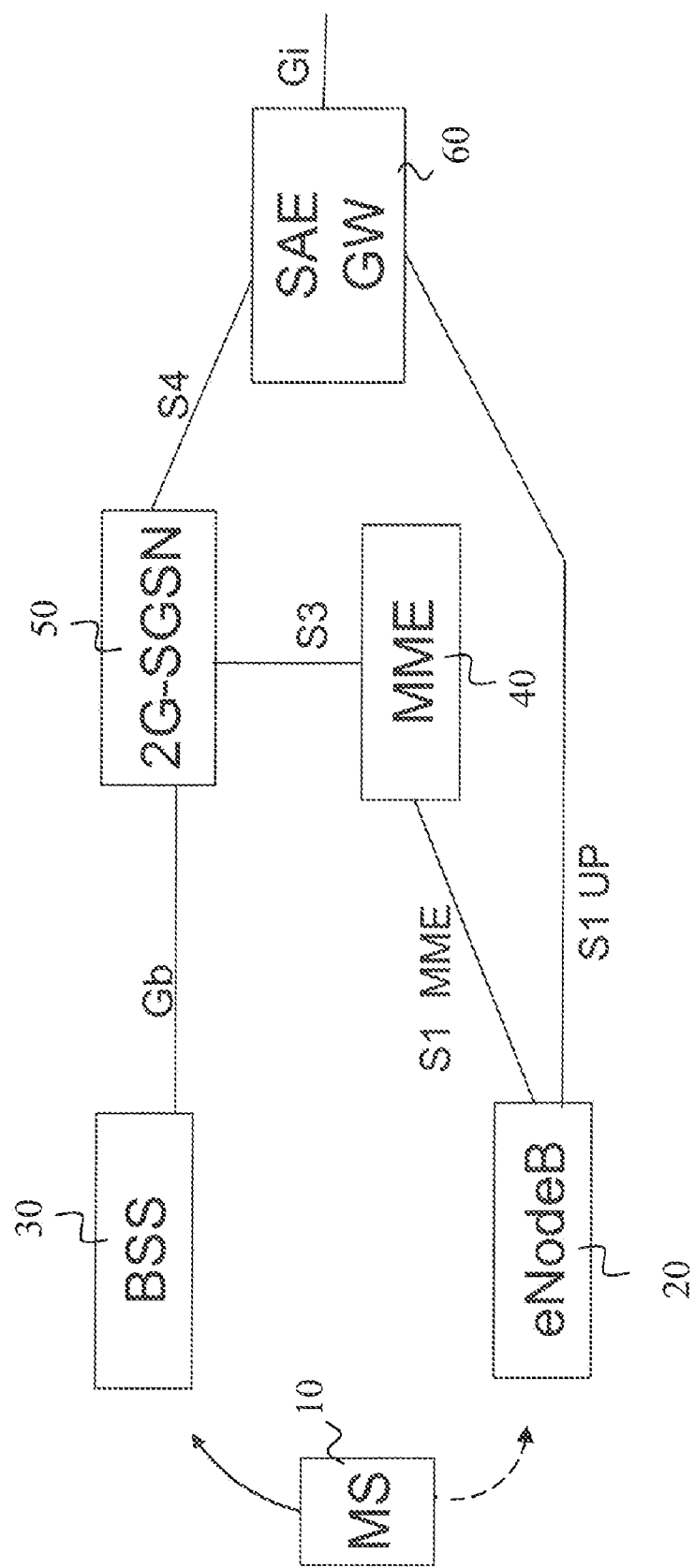
FIG. 2 shows a schematic overview of a communication device in an handover process from an eNodeB to a BSS.

FIG. 2 shows in a high level the architecture for the exemplary scenario i.e. when an MS is performing PS HO from LTE to GERAN. An eNodeB 20 of the LTE determines that a handover should be performed based on, for example, a received measurement report from the MS 10 of a signal from a GERAN cell controlled by a base station BSS 30 in GERAN. The eNodeB 20 communicates handover info to a Mobility Management Entity, MME, 40 in the LTE. The MME 40 then transmits handover information to a $2^{nd}$ Generation Serving GPRS Supporting Node, 2G-SGSN, 50 in the GERAN. The eNodeB 20 is also in communication with a System Architecture Evolution GateWay SAE GW 60. Another name used for the SAE-GW is the combination of Serving Gateway and PDN (Packet Data Network) Gateway.

In order for the handover to proceed as smoothly as possible the BSS 30 determines an OBR based on at least one or a number of parameter/s. The BSS 30 then informs the MS 10 about the OBR via the different nodes of the LTE and GERAN.

The MS 10 then receives the OBR in a message, for example, in a handover command or the like. Based on the OBR the MS may then change an operational mode of an application in the MS 10 to an operational mode using a bit rate closer to the OBR. For example, the MS receives a message indicating an OBR of 220 kbps and the MS is running an application using 320 kbps, the MS will then change to a mode using 192 kbps, being the closest bit rate of an operational mode of the application not exceeding the OBR.

The MS then informs the sending/receiving part being a second MS or the like, of the changing of the current bit rate so that the sending/receiving part may adapt to the changing current bit rate.

Figure 3:
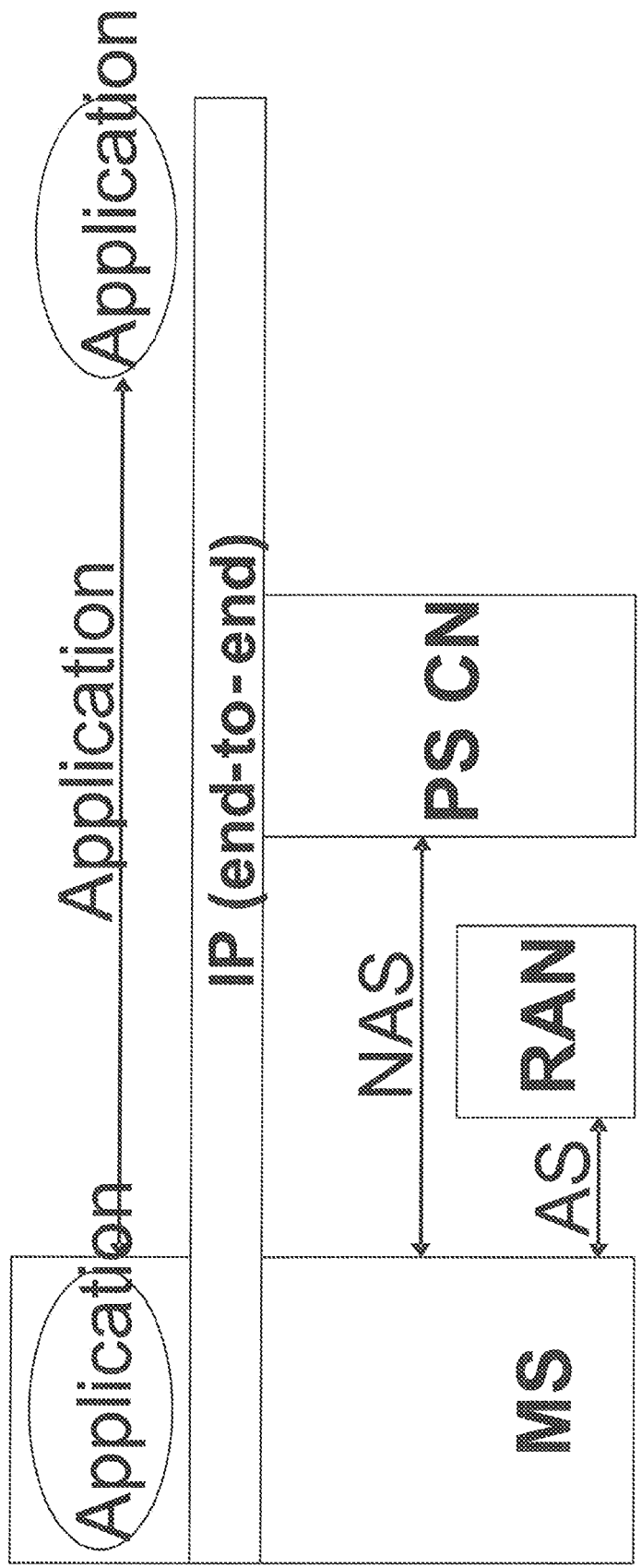
FIG. 3 shows a schematic overview the different levels of communication in relation to the MS/UE also shown in FIG. 2.

FIG. 3 shows schematically the different levels of communication in relation to the MS also shown in FIG. 2. The approach is that the current Radio Access Network (RAN) and the current PS Core Network (CN) are shown. The MS communicates with the RAN using Access-Stratum (AS) signaling and with PS CN using Non-Access-Stratum (NAS) signaling. In addition, there is an application in the MS that communicates with another application using IP protocols. The other application, i.e. the one to the right in FIG. 3, may be almost of any type and located almost anywhere, e.g. it could be another MS located in another or in the same RAN or it could e.g. be a fixed server.

Hence, MS moves between radio access types with different capabilities, e.g. between LTE and GERAN or the like. If the MS is currently active in e.g. LTE or the like, then the RAN consists of eNodeB and the PS CN consists of Mobility Management Entity, MME, and System Architecture Evolution GateWay, SAE GW.

Figure 4:
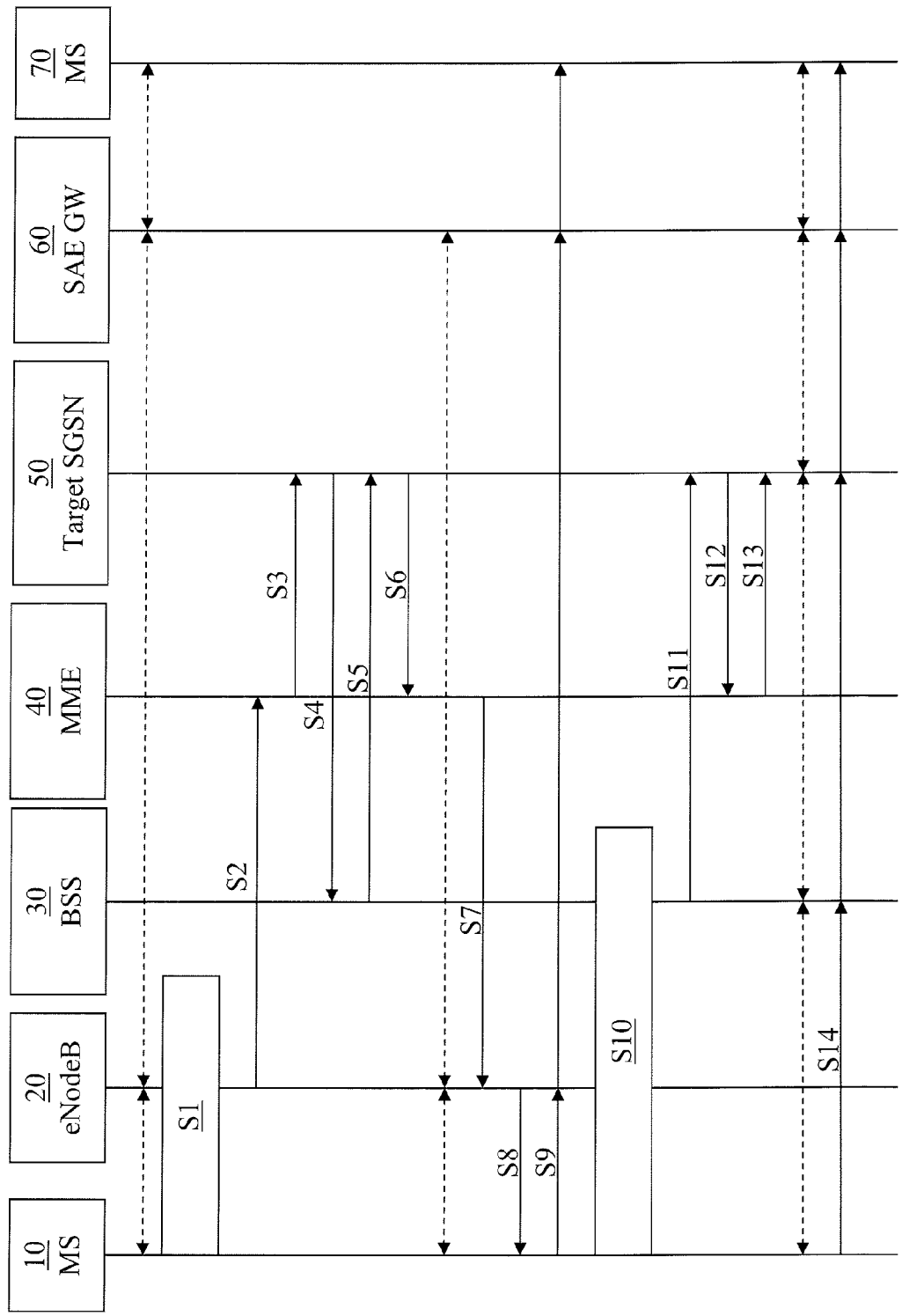
FIG. 4 shows a schematic signalling scheme of a handover process from a node in LTE to a node in GERAN.

FIG. 4 shows a signaling sequence and also in this case the PS HO from LTE to GERAN is used as an example. This figure is simplified and both preparation and execution phases are shown as defined in 3GPP.

A first MS 10 is communicating with a second MS 70 over serving SAE GW in an application.

In step S1, a handover procedure is initiated. The handover may be initiated by the first node, eNodeB 20, receiving a measurement report from the MS 10. The measurement report indicates measurement of a signal from a GERAN cell controlled by a second node, BSS 30. The eNodeB 20 analyses the measurement report and a Handover preparation phase, including a Handover request, is initiated between the eNodeB 20 and a BSS 30 to determine that a handover is to be performed.

In step S2, the eNodeB 20 transmits the handover request to the MME 40. In the embodiments wherein the measurement report is received, the measurement report is included in the PS Handover preparation phase.

In step S3, the MME 40 transmits a forward relocation request comprising an indication of the measurement from the MS 10 to a target SGSN 50 serving the BSS 30.

In step S4, the target SGSN 50 transmits a packet switched handover request comprising an indication of the measurement from the MS 10 to the BSS 30.

In step S5, the BSS 30 estimates and determines an offered bit rate OBR based on one or a plurality of parameters, for example, using the received measurement from the MS 10 and/or the like, and transmits a Packet Switched Handover Request Acknowledgement comprising an indication of the OBR to the target SGSN 50.

In step S6, the target SGSN transmits a forward relocation response comprising an indication of the OBR to the MME 40 serving the eNodeB 20.

In step S7, the MME 40 transmits a handover command comprising an indication of the OBR to the eNodeB 20.

In step S8, the eNodeB 20 initiates a handover by sending a "Handover from E-UTRAN Command" message to the MS 10 to indicate to the MS 10 that it should begin the handover procedure. The eNodeB 20 transmits parameters needed by the MS 10 to create the appropriate messages needed to request a connection at the GERAN. The HO E-UTRAN command message comprises an indication of the OBR.

In step S9, the MS 10 uses the received OBR and determines a new current bit rate to use based on the OBR and transmits a notification of the new current bit rate to the second MS 70 to inform about the new current bit rate via the source eNodeB 20 using some application level mechanism, such as Real time transport control protocol RTCP or the like.

In step S10, the MS 10 performs a GERAN A/Gb Access Procedure with the BSS 30 to access BSS 30.

In step S11, the BSS 30 transmits a Packet Switched Handover Complete to the target SGSN 50.

In step S12, the target SGSN 50 transmits a forward location complete message to the MME 40.

In step S13, the MME 40 acknowledges the forward complete message by sending an acknowledgement to the target SGSN 50.

The MS 10 then transmits data through the GERAN network as illustrated with a dotted line.

As an alternative to step 9, step 14 is provided.

In step 14, the MS 10 uses, after the handover is complete, the received OBR and determines a new current bit rate to use based on the OBR and transmits a notification of the new current bit rate to the second MS 20 to inform about the new current bit rate via the BSS 30 using some application level mechanism, such as RTCP or the like.

When determining the current bit rate, the current bit rate is based on the OBR and could be the same as the OBR. However, the current bit rate does not have to be the same as the OBR, as the application in the MS 10 may have predetermined sending/encoding rates. For example, the MS 10 may determine to use an encoding mode of an application in the first MS 10 and/or the second MS 70 to increase/decrease the current bit rate to/from the second MS 70.

Steps 9 or 14 are provided to inform the other side that the MS 10 can now receive with a particular bit rate but the MS 10 may also adapt the sending direction accordingly. In addition, in some embodiments, the MS 10 may receive and transmit different bit rates, so called asymmetrical bit rates i.e. that the sending and receiving bit rates are not necessarily the same.

Thereby, problems concerning buffering and delays are solved. The applications get more detailed information about the new OBR and therefore, the application adapts more correctly to the new setting. Embodiments also provide an upgrade mechanism, for example, it is possible to indicate that the current bit rate could be increased again.

Figure 5:
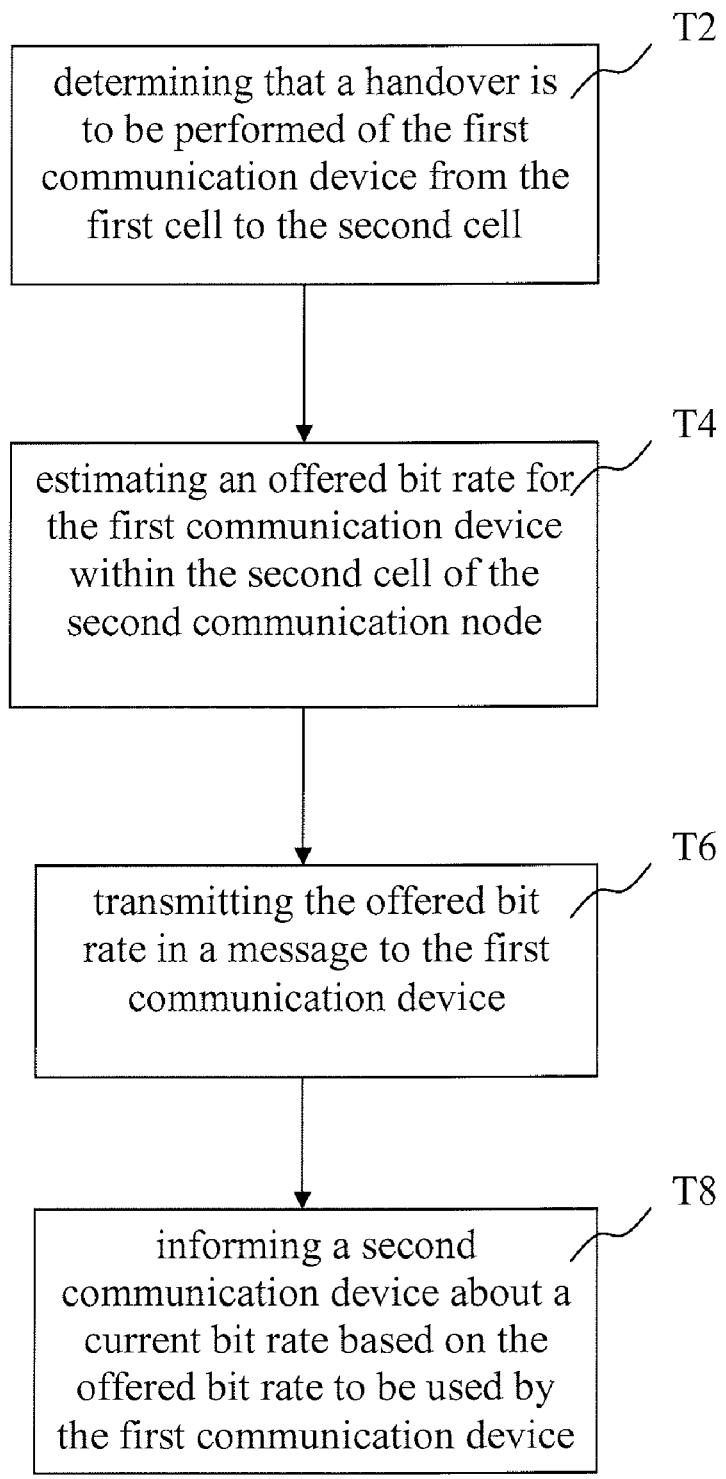
FIG. 5 shows a schematic overview of a method in a method in a second communication node.

In FIG. 5, a schematic overview of a method in a second communication node for supporting a handover process of a first communication device, such as a MS or the like, from a first cell in the communications network to a second cell. The second cell is served by the second communication node. The first cell may in some embodiments be served by a first communication node being different than the second communication node and in some alternative embodiments be served by the same second communication node, for example, in a base station serving multi-RAT cells and/or the like.

The handover process may be a handover between cells of different RAT technologies, between a micro cell and a macro cell, and/or the like.

In step T2, the second communication node determines that a handover is to be performed of the first communication device from the first cell to the second cell.

In the case of the first cell being a cell served by a first communication node being different than the second communication node, the second communication node may determine that a handover is to be performed based on receiving a handover request from the first communication node.

In case the first cell is served by the same second communication node, the second communication node determines a handover to be performed based on measurement report/s from the communication device of the first cell being a different internal cell.

In step T4, the second communication node estimates an offered bit rate for the communication device within the second cell of the second communication node based on at least one parameter of the second cell.

In some embodiments, the parameter comprises load in the second cell, communication device capabilities, radio access bearers/packet flow contexts and/or the like.

Furthermore, the second communication node may receive a measurement report of the second cell originating from the first communication device and the at least one parameter comprises the measurement report and/or what is stated above, to be used to estimate the offered bit rate.

The measurement report may, in embodiments wherein the first cell is served by the first communication node, be indicated in a handover request from the first communication node.

In step T6, the second communication node transmits the offered bit rate in a message to the first communication device.

It should here be understood that the message may be a handover command comprising an indication of the offered bit rate. In some embodiments, for example, wherein the first cell is served by a first communication node, the message is transmitted via the first communication node to the first communication device. The message may be comprised in a handover command or the like.

As an optional step T8, a current bit rate to be used by the first communication device based on the offered bit rate is transmitted via the second communication node to a second communication device. The current bit rate is received from the first communication device. This step could be performed as totally transparent for the second communication node e.g. it would be sent over the PS domain user plane in a same way as for example internet surfing from the first communication device.

In order to perform the method a second communication node is provided.

Figure 6:
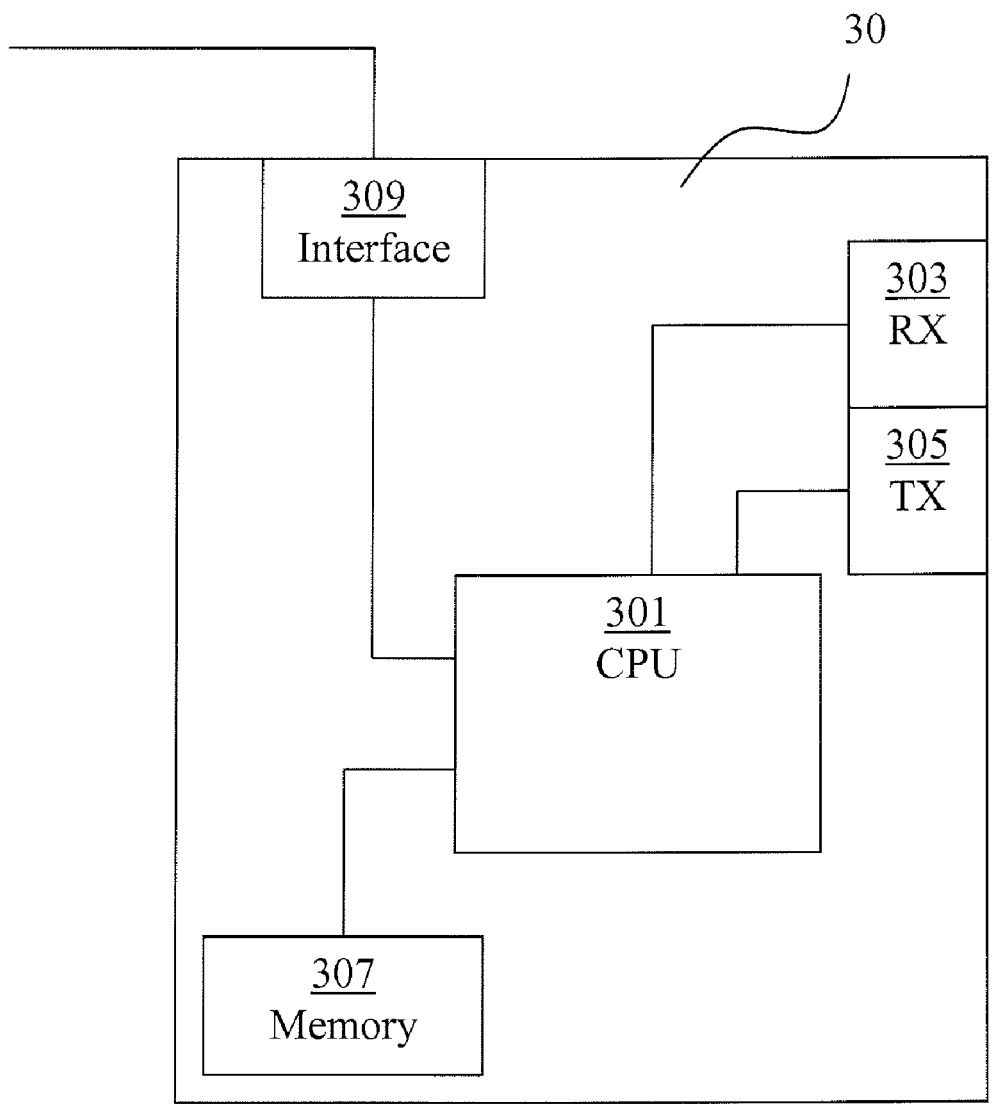
FIG. 6 shows a schematic overview of a second communication node.

The second communication node may be a base station, an eNodeB, a NodeB, a controller node or a combination thereof and the handover may be performed between cells of different capacities, RAT technologies, between a micro cell and a macro cell, and/or the like, In FIG. 6, a second communication node 30 is disclosed.

The second communication node 30 comprises a control unit 301 arranged to determine that a handover is to be performed of a first communication device from a first cell in the communications network to a second cell of the second communication node. In some embodiments, the first cell is a cell of a first communication node and the second communication node further comprises a network interface 309 arranged to receive a handover request from the first communication node. The control unit 301 is arranged to determine that a handover is to be performed based on the received handover request.

In some embodiments, the first cell is a cell served by the second communication node and the control unit 301 is arranged to determine that a handover is to be performed based on a received measurement report from the first communication device of the second cell.

The control unit 301 is further arranged to estimate an offered bit rate for the first communication device within the second cell of the second communication node based on at least one parameter of the second cell.

The at least one parameter of the second cell may be load of the second cell, communication device capabilities, radio access bearers/packet flow contexts and/or the like.

In some embodiments, the second communication node 30 is arranged to receive a measurement report of the second cell from the first communication device over the network interface 309 or a receiving arrangement 303 and the at least one parameter comprises the measurement report. The control unit 301 is arranged to use at least the measurement report to estimate the offered bit rate. In some embodiments, a handover request from the first communication node of the first cell is arranged to comprise the measurement report.

The second communication node 30 furthermore comprises a communication interface. In the case when both the first and second cell are controlled by the second communication node, the communication interface comprises a transmitting arrangement 305 adapted to transmit the offered bit rate in a message to the first communication device and the receiving arrangement 303 arranged to receive the measurement report. In the case when the first and second cells are served by different communication nodes, the communication interface comprises the network interface 309, wherein the offered bit rate will be sent through the network interface 309.

In some embodiments, the message is arranged to be transmitted to the first communication device via the first communication node.

In some embodiments, wherein the first and second cell is served by the same communication node, the second communication node transmits the message to the first communication device over its own radio access network.

In some embodiments, the message of offered bit rate is comprised in a handover command. It should here be understood that the second communication node may in some embodiments build the whole Handover command message that is finally sent to the first communication device and then the first communication node is kind of transparent. But in, for example, handover to LTE, such as Intra-LTE handover or the like, then the building of the handover command message could be a combination of transparent information from the second communication node and some information added to the handover command message by the first communication node. In this case the source first communication node would not be transparent.

In some embodiments, the second communication node 30 comprising the receiving arrangement 303 is adapted to receive an indication of a current bit rate to be used based on the offered bit rate from the first communication device. The network interface 309 is further arranged to inform a second communication device about the current bit rate to be used by the first communication device. Hence, the second communication node 30 may transmit the CuBR to a SGSN of the second node which forwards the CuBR to the second communication device. The current bit rate to be used by the first communication device based on the offered bit rate is transmitted via the second communication node to a second communication device. This could be performed as totally transparent for the second communication node e.g. it would be sent over the PS domain user plane in a same way as for example internet surfing from the first communication device.

In some embodiments, the second communication device may further comprise a memory 307 wherein application/s may be stored, applications being arranged to get the control unit 301, when executed on the control unit 301, to perform the method and/or store data relating to different cells.

Figure 7:
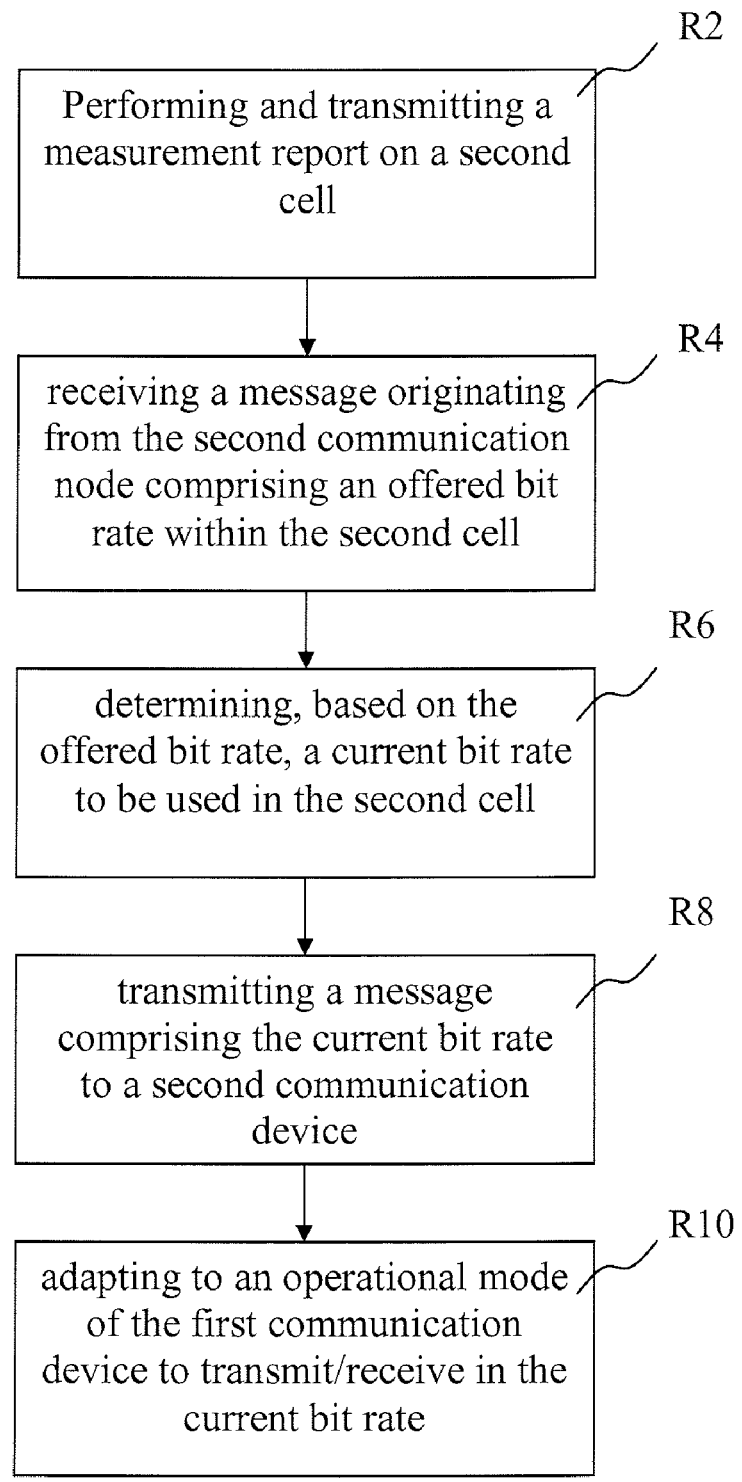
FIG. 7 shows a schematic overview of a method in a method in a first communication device.

In FIG. 7, a method in a first communication device within a communications network is shown. The method is supporting a handover process of the first communication device from a first cell in the communications network to a second cell of a second communication node in the communications network.

In optional step R2, the first communication device receives a radio signal from the second cell. The first communication device performs a measurement of the signal and creates a measurement report on the signal. The measurement report is then transmitted to the communication node serving the first cell to be used to determine whether a handover is to be performed.

Hence, in some embodiments, the measurement report is transmitted to a first communication node when the first cell is served by the first communication node and, in some embodiments; the measurement report is transmitted to the second communication node when the first cell is served by the second communication node.

Then, during or after the handover procedure the following takes place.

In step R4, the first communication device receives a message originating from the second communication node comprising an offered bit rate within the second cell.

In step R6, the first communications device then determines based on the offered bit rate a current bit rate to be used in the second cell also taken into account an application to be used in the second cell. It should here be understood that the application may be running in the first communication device or to be initiated during or after the handover.

In step R8, the first communication device then transmits a message comprising the current bit rate to a second communication device. In some embodiments, the first cell is a cell served by a first communication node and the message is transmitted to the second communication device via the first communication node. In some embodiments, the message is transmitted to the second communication device via the second communication node. It should here be understood that the message may be comprised in, for example, RTCP signalling or the like.

In step R10, the first communication device then adapts an operational mode of the first communication device to communicate i.e. transmit/receive in the current bit rate not exceeding the offered bit rate. Hence, the first communication device may decrease its rate if the offered bit rate is a rate lower than present rate but also increase its rate of the application if the offered bit rate is a rate higher than that of an operational mode of higher bit rate.

For example, the first communication device is receiving a file from a second communication device of 320 kbps and a handover is performed. The first communication device receives an offered bit rate of 150 kbps from the second cell and the file transfer application has a second operational mode of transmitting data with 128 kbps. The first communication device then transmits a message to the second communication device that it will be using the operational mode of 128 kbps instead of 320 kbps. The second communication device then adapts to this operational mode and transmits the file with a 128 kbps. Then, at the next handover, the operational mode of the first communication device may be changed to a mode of a higher bit rate, for example, 520 kbps. In all cases, the second communication device is informed about the change of current bit rate so that the second communication device may adapt so that the handover is enhanced in performance.

In order to perform the method a first communication device is provided. A first communication device may be a user equipment, such as a mobile phone, a PDA, a laptop, a server and or the like.

Figure 8:
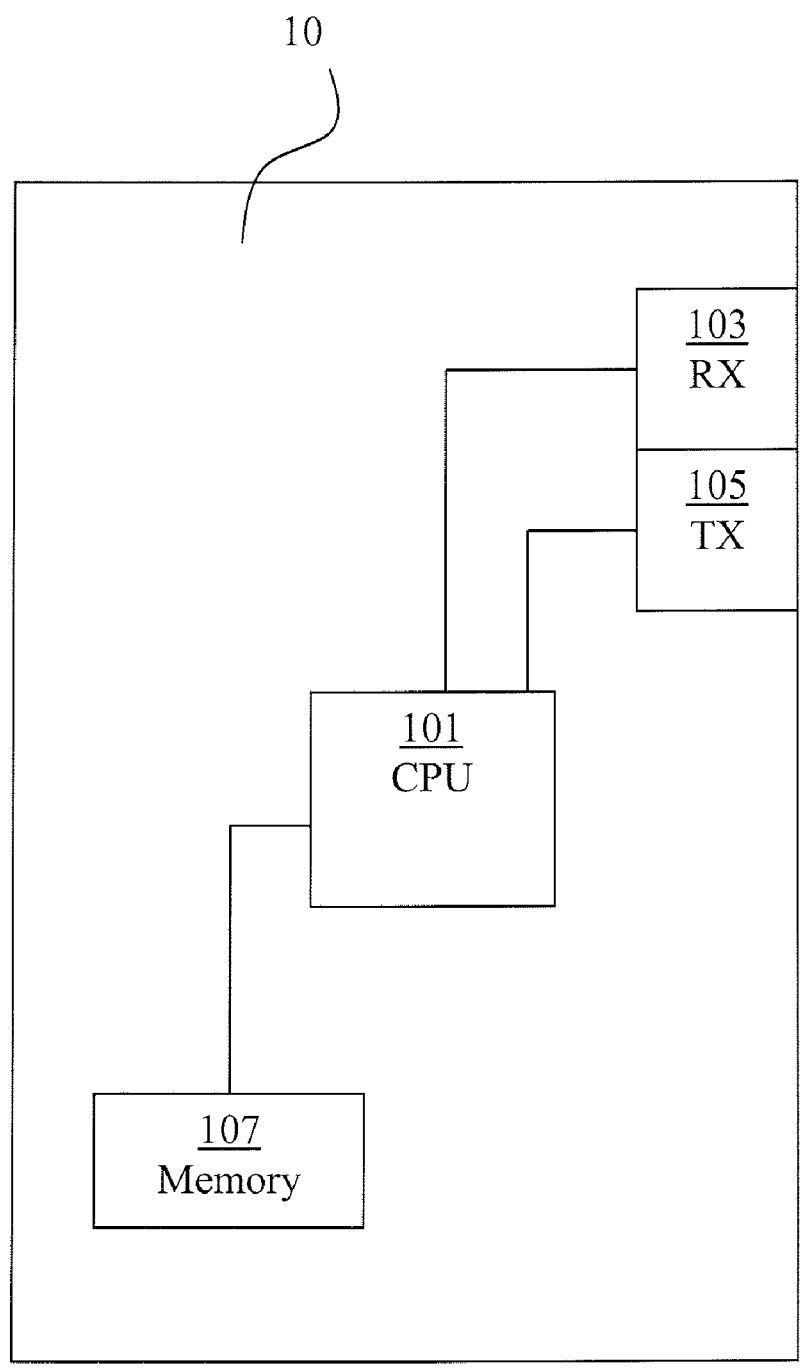
FIG. 8 shows a schematic overview of a first communication device.

In FIG. 8, a schematic overview of a first communication device is shown.

The first communication device 10 comprises a control unit 101 arranged to receive a message via a receiving arrangement 103 originating from a second communication node during a handover process of the first communication device from a first cell in the communications network to a second cell of the second communication node in the communications network.

The message comprises an offered bit rate within the second cell and the control unit 101 is further arranged to determine a current bit rate to be used in the second cell based on the offered bit rate and an application to be used in the second cell.

The first communication device 10 further comprises a transmitting arrangement 105 adapted to transmit a message comprising the current bit rate to a second communication device and then the control unit 101 is further arranged to adapt to an operational mode of the first communication device to communicate i.e. transmit/receive, in the current bit rate. The message may in some embodiments, be arranged to be transmitted to the second communication device via the second communication node and in some embodiments to the second communication device via the first communication node. It should here be understood that the message may be comprised in RTCP signalling between the different nodes.

In some embodiments, the first communication device 10 further comprises a receiving arrangement 103 adapted to receive a radio signal from the second cell. The control unit 101 is then arranged to perform a measurement on the received signal and to create a measurement report on the received signal. The transmitting arrangement 105 is then, in embodiments wherein the first cell is served by a first communication node, further adapted to transmit the measurement report to the first communication node.

In some embodiments, wherein the first cell is a cell of the second communication node the transmitting arrangement 105 is adapted to transmit the measurement report to the second communication node.

In some embodiments, the first communication device may further comprise a memory 107 wherein application/s may be stored to perform the method and/or data.

Figure 9:
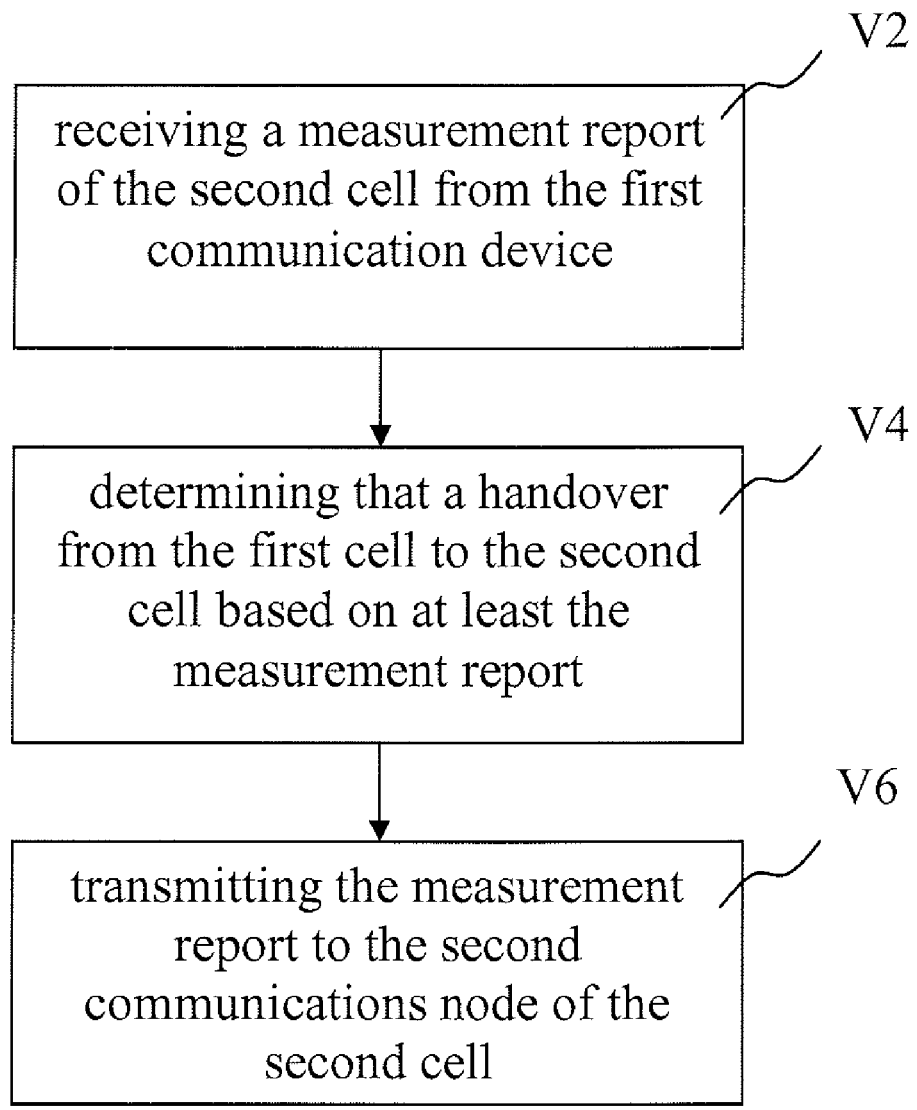
FIG. 9 shows a schematic overview of a method in a method in a first communication node.

In FIG. 9, a schematic overview of a method in a first communication node is shown. The method is performed in a first communication node in a communications network supporting a handover process of a first communication device from a first cell of the first communication node to a second cell of a second communication node.

In step V2, the first communication node receives a measurement report of the second cell from the first communication device, In step V4, the first communication node determines that a handover from the first cell to the second cell based on at least the measurement report is to be performed.

In step V6, the first communication device transmits the measurement report to the second communications node of the second cell.

In order to perform the method a first communication node is provided. The first communication node may be a base station, eNodeB, NodeB, a controller, a combination thereof and/or the like.

Figure 10:
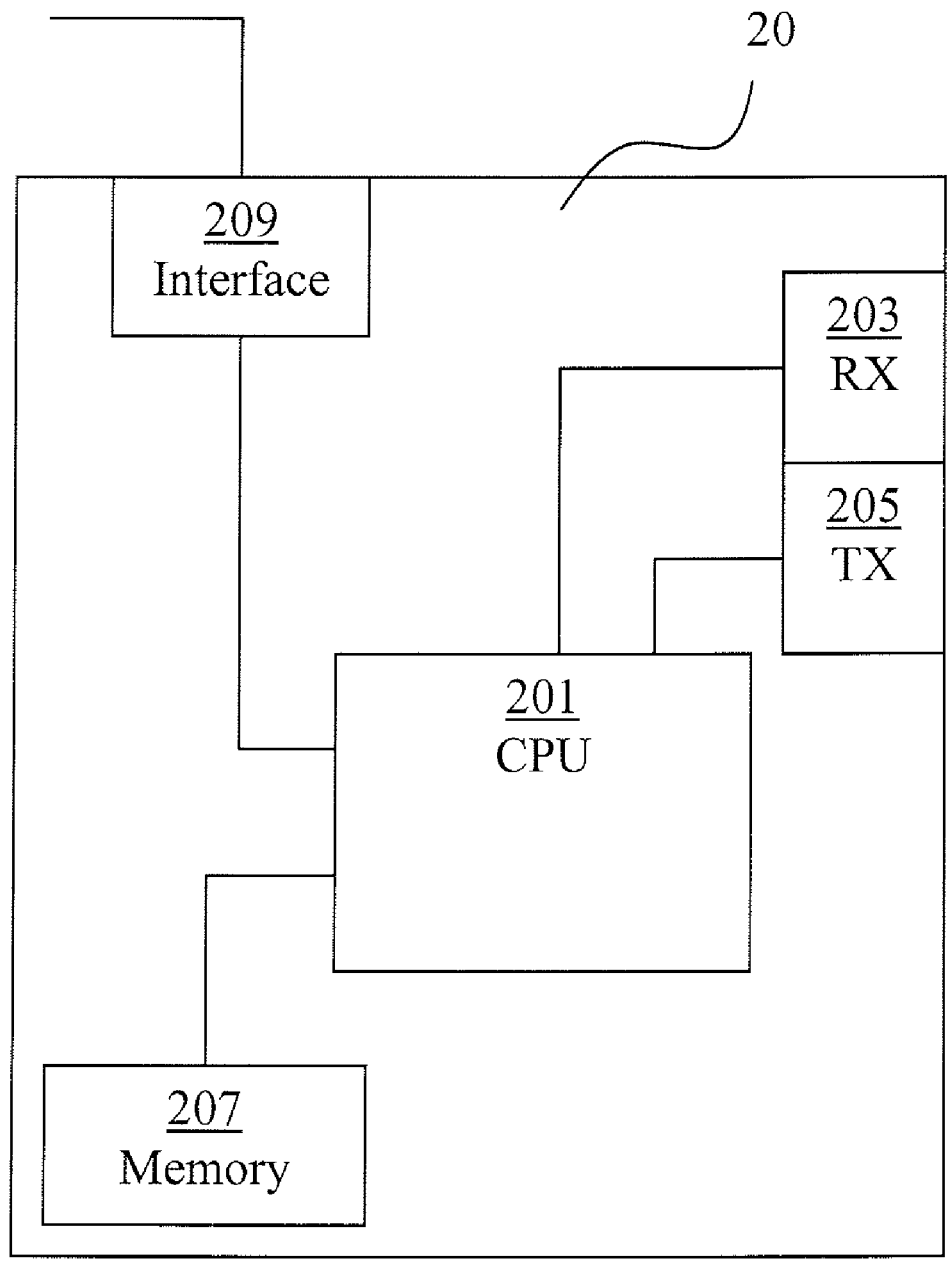
FIG. 10 shows a schematic overview of a first communication node.

In FIG. 10, a schematic overview of a first communication node 20 serving a first cell in a communications network is shown.

The first communication node 20 comprises a receiving arrangement 203 arranged to receive a measurement report of a second cell of a second communication node from a first communication device.

The first communication node 20 comprises a control unit 201 arranged to analyse the measurement report to determine whether to perform a handover of the first communication device from the first cell to the second cell, and a network interface 209 arranged to transmit the measurement report to the second communication node of the second cell for the second communication node to use when estimating the offered bit rate.

The first communication node may also receive, over interface 209, a handover command comprising an offered bit rate of the second cell that it may process or just forward to the first communication device over a transmitting arrangement 205. The first communication node also receives a message from the first communication device over a receiving arrangement 203 with a current bit rate indicated to be used by a second communication device to adapt to an upcoming bit rate change. This current bit rate may be forwarded by the first communication node to the second communication device over a network.

In some embodiments, the first communication node 20 may further comprise a memory 207 wherein application/s may be stored to perform the method and/or data relating to different cells.

Figure 11:
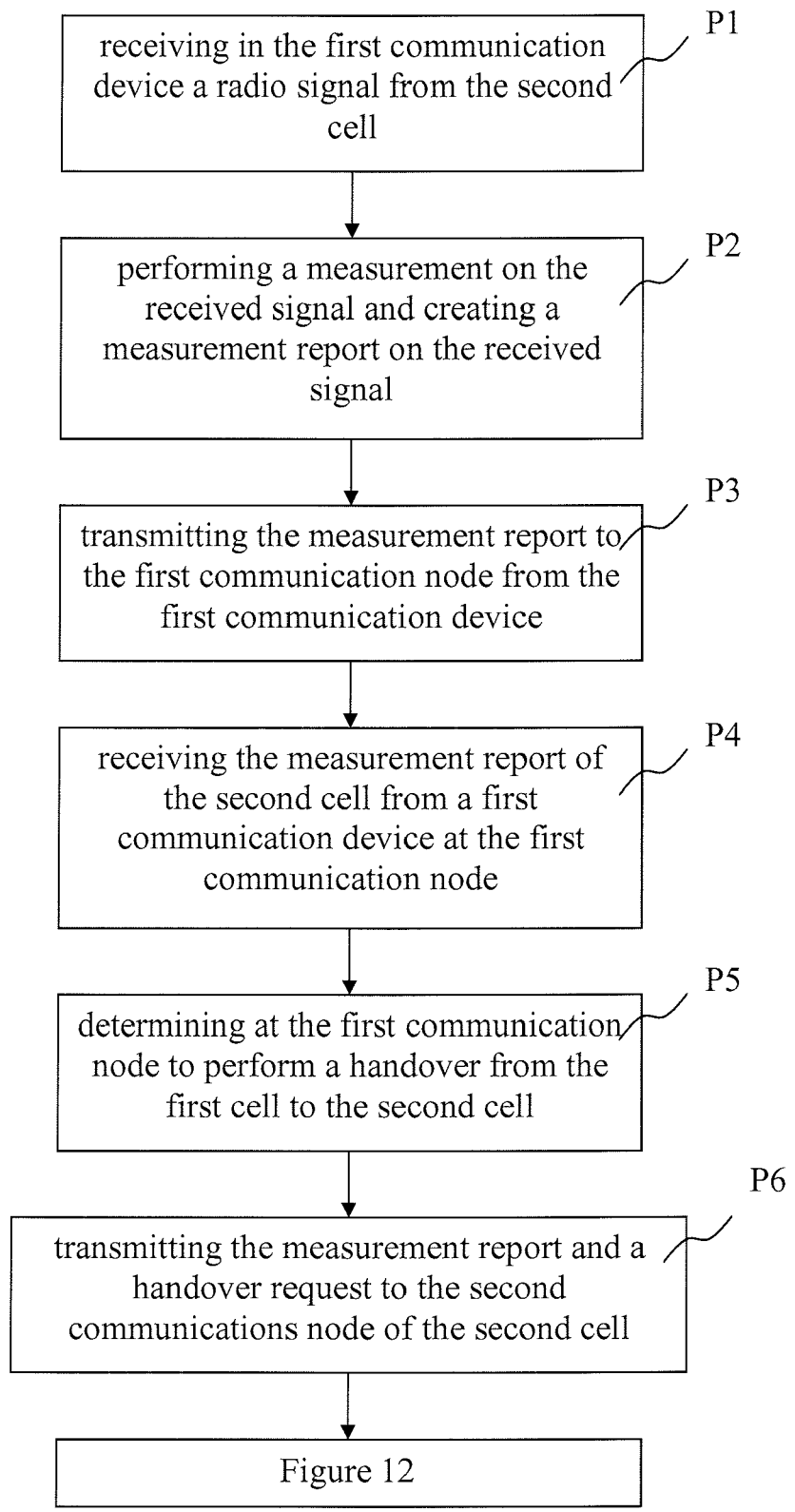
FIGS. 11 and 12 show a method in a system in a communications network.
Figure 12:
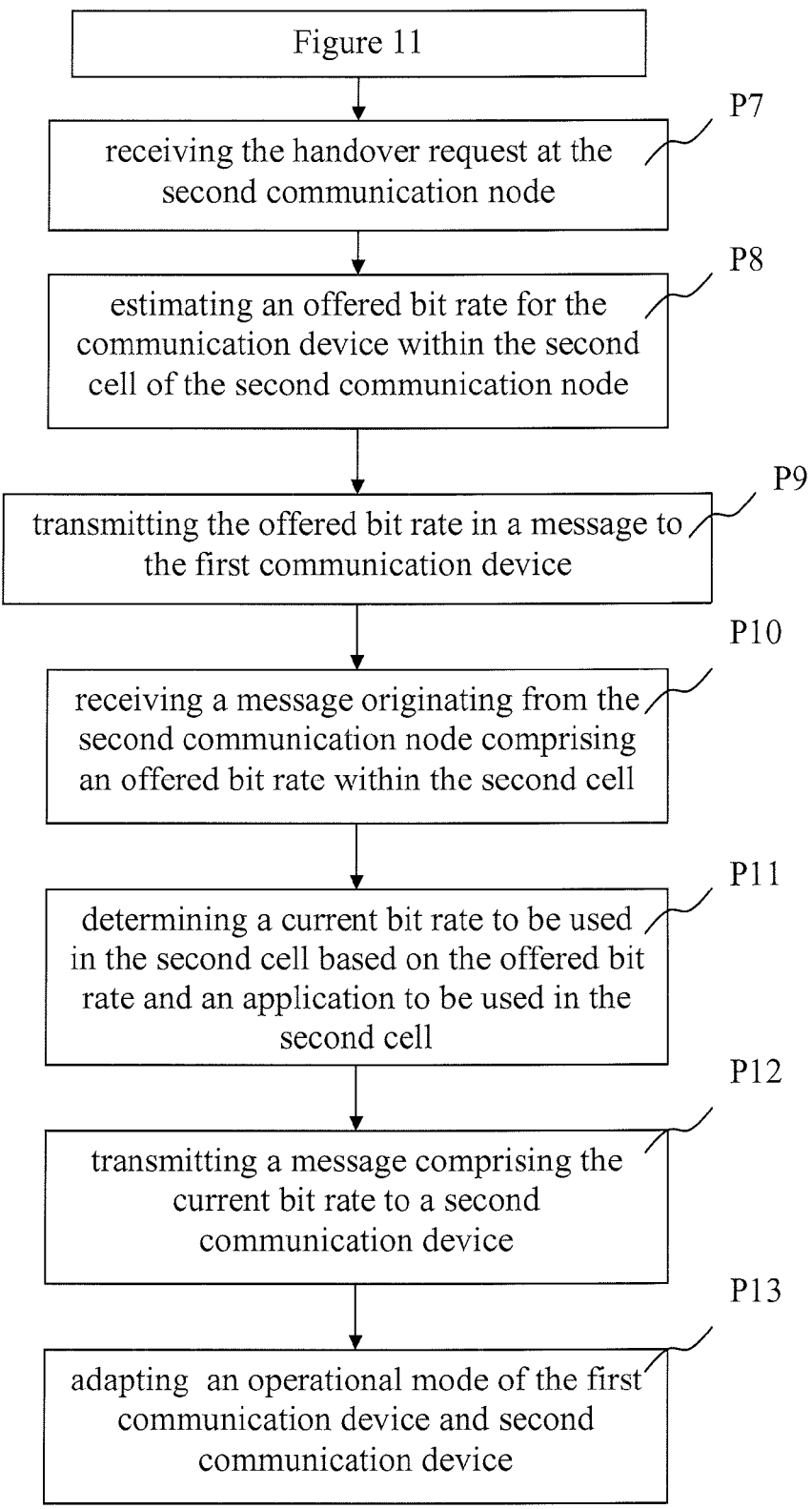

In FIGS. 11 and 12, a method in a system in a communications network to perform a handover process in the communications network of a first communication device from a first cell of a first communication node to a second cell of a second communications node is shown.

In step P1, the first communication device receives a radio signal from the second cell.

In step P2, the first communication device performs a measurement on the received signal and creates a measurement report on the received signal.

In step P3, the first communication device transmits the measurement report to the first communication node.

In step P4, the first communication node receives the measurement report of the second cell from a first communication device.

In step P5, the first communication node determines to perform a handover from the first cell to the second cell based on at least the measurement report.

In step P6, the first communication node transmits the measurement report and a handover request to the second communication node of the second cell.

In step P7, the second communication node receives the handover request and determines that a handover is to be performed of the first communication device from the first cell to the second cell.

In step P8, the second communication node estimates an offered bit rate for the first communication device within the second cell of the second communication node based on at least one parameter of the second cell.

In step P9, the second communication node transmits the offered bit rate in a message to the first communication device via the first communication node.

In step P10, the first communication device receives a message originating from the second communication node comprising an offered bit rate within the second cell.

In step P11, the first communication device determines a current bit rate to be used in the second cell based on the offered bit rate and an application to be used in the second cell.

In step P12, the first communication device transmits a message comprising the current bit rate to a second communication device.

In step P13, the first communication device and the second communication device adapts an operational mode respectively to communicate, that is, transmit/receive, using the current bit rate.

It should be noted that a control unit may be a single processing unit, a central processing unit or a plurality of processing units. Similarly, a memory unit may be a single memory unit or a plurality of memory units, e.g. internal and/or external memories. A network interface is a communicative interface toward e.g. a wired network and/or the like, and transmitting and receiving arrangements comprise e.g. wirelessly communicating antennas and/or the like.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a second communication node within a communications network supporting a handover process of a first communication device from a first cell in the communications network to a second cell of the second communication node in the communications network, comprising the following steps:
receiving a measurement report of the second cell originating from the first communication device;
determining that a handover is to be performed of the first communication device from the first cell to the second cell;
estimating an offered bit rate for the communication device within the second cell of the second communication node based on at least one parameter of the second cell, wherein the at least one parameter comprises at least the measurement report to be used in the step of estimating the offered bit rate;
transmitting the offered bit rate in a message to the first communication device; and
informing a second communication device about a current bit rate based on the offered bit rate to be used by the first communication device and an application to be used in the second cell.

2. The method according to claim 1, wherein the first cell is a cell of a first communication node and the step of determining that the handover is to be performed comprises to receive a handover request from the first communication node.

3. The method according to claim 1, wherein the first cell is a cell of the second communication node and the determining step that a handover is to be performed is based on the received measurement report.

4. The method according to claim 1, wherein the message of offered bit rate is comprised in a handover command.

5. A second communication node comprising:
a control unit configured to determine that a handover is to be performed of a first communication device from a first cell in a communications network to a second cell of the second communication node in the communications network;
wherein the control unit is further configured to estimate an offered bit rate for the first communication device within the second cell of the second communication node based on at least one parameter of the second cell,
the second communication node further comprises a communication interface configured to transmit a message comprising the offered bit rate to the first communication device
a network interface configured to receive a measurement report of the second communication node from the first communication device, wherein the at least one parameter comprises the measurement report
the control unit is configured to use at least the measurement report to estimate the offered bit rate;
wherein the first cell is a cell of a first communication node;
wherein the communication interface comprises a network interface configured to transmit the message comprising the offered bit rate and configured to receive a handover request from the first communication node;
wherein the control unit is configured to determine that a handover is to be performed based on the received handover request;
a receiving arrangement configured to receive an indication of a current bit rate to be used based on the offered bit rate from the first communication device and an application to be used in the second cell; and
wherein the network interface is further configured to inform a second communication device about the current bit rate to be used by the first communication device.

6. The second communication node according to claim 5, wherein the message of offered bit rate is comprised in a handover command.

7. The second communication node according to claim 5, wherein the first cell is a cell served by the second communication node, and the communication interface comprises a transmitting arrangement, wherein the second communication node further comprises a receiving arrangement configured to receive a measurement report and the control unit is configured to determine that a handover is to be performed based on a received measurement report from the first communication device of the second cell.

8. A method in a first communication device within a communications network connected to a first cell in the communications network, comprising the steps of:
receiving a radio signal from a second cell;
performing a measurement on the received signal and creating a measurement report on the received signal;
if the first cell is served by a first communication node, transmitting the measurement report to the first communication node, or, if the first cell is served by the second communication node, transmitting the measurement report to the second communication node;
receiving a message originating from the second cell of a second communication node comprising an offered bit rate within the second cell,
determining a current bit rate to be used in the second cell based on the offered bit rate and an application to be used in the second cell,
transmitting a message comprising the current bit rate to a second communication device, and
adapting an operational mode of the first communication device to communicate in the current bit rate.

9. The method according to claim 8, wherein the first cell is a cell served by said first communication node and the message is transmitted to the second communication device via the first communication node.

10. A first communication device comprising a control unit configured to, via a receiving arrangement, receive a message originating from a second communication node during a handover process of the first communication device from a first cell in the communications network to a second cell of the second communication node in the communications network, wherein the message comprises an offered bit rate within the second cell and the control unit is further configured to determine a current bit rate to be used in the second cell based on the offered bit rate and an application to be used in the second cell, the first communication device further comprises a transmitting arrangement configured to transmit a message comprising the current bit rate to a second communication device, the control unit is further configured to adapt an operational mode of the first communication device to communicate in the current bit rate, the receiving arrangement is configured to receive a radio signal from the second cell, the control unit is configured to perform a measurement on the received signal and to create a measurement report on the received signal, and if the first cell is served by a first communication node, the transmitting arrangement is further configured to transmit the measurement report to the first communication node if, or if the first cell is served by the second communication node, the transmitting arrangement is configured to transmit the measurement report to the second communication node.

11. The first communication device according to claim 10, wherein the first cell is a cell served by said first communication node and the message is configured to be transmitted to the second communication device via the first communication node.

12. A method in a system in a communications network supporting a handover process in the communications network of a first communication device from a first cell of a first communication node to a second cell of a second communications node comprising the steps of:

receiving in the first communication device a radio signal from the second cell;

performing a measurement on the received signal and creating a measurement report on the received signal;

transmitting the measurement report to the first communication node from the first communication device;

receiving the measurement report of the second cell from a first communication device at the first communication node;

determining at the first communication node to perform a handover from the first cell to the second cell based on at least the measurement report;

transmitting the measurement report and a handover request to the second communications node of the second cell;

receiving the handover request at the second communication node and determining in the second communication node that a handover is to be performed of the first communication device from the first cell to the second cell;

estimating an offered bit rate for the communication device within the second cell of the second communication node based on at least one parameter of the second cell;

transmitting the offered bit rate in a message to the first communication device via the first communication node;

receiving a message originating from the second communication node comprising the offered bit rate within the second cell;

determining a current bit rate to be used in the second cell based on the offered bit rate and an application to be used in the second cell;

transmitting a message comprising the current bit rate to a second communication device; and adapting an operational mode of the first communication device and the second communication device to communicate in the current bit rate.

* * * * *

UNITED STATES PATENT AND TRADEMARK OFFICE
CERTIFICATE OF CORRECTION

PATENT NO. : 8,311,542 B2
APPLICATION NO. : 12/812136
DATED : November 13, 2012
INVENTOR(S) : Persson et al.

Page 1 of 1

It is certified that error appears in the above-identified patent and that said Letters Patent is hereby corrected as shown below:

In the Specifications:

In Column 1, Line 21, delete "$MBR \leqq SBR.$" and insert -- $MBR \leqq GBR.$ --, therefor.

In Column 5, Line 41, delete "MS" and insert -- MS 10 --, therefor.

Signed and Sealed this
Twelfth Day of March, 2013

Teresa Stanek Rea
*Acting Director of the United States Patent and Trademark Office*